United States Patent [19]

Lindsay et al.

[11] 4,208,696
[45] Jun. 17, 1980

[54] ELECTRICALLY CONDUCTIVE WEB

[75] Inventors: Thomas W. Lindsay, Minneapolis; Walter M. Westberg, Saint Paul, both of Minn.

[73] Assignee: Minnesota Mining and Manufacturing Company, Saint Paul, Minn.

[21] Appl. No.: 925,537

[22] Filed: Jul. 19, 1978

Related U.S. Application Data

[63] Continuation-in-part of Ser. No. 830,841, Sep. 6, 1977, abandoned.

[51] Int. Cl.² .................................................. H05F 3/00
[52] U.S. Cl. ..................... 361/212; 428/244; 428/247; 428/248; 428/311; 428/367; 428/408; 428/922
[58] Field of Search ............... 428/244, 246, 247, 250, 428/252, 255, 265, 310, 311, 315, 408, 425, 922, 367; 361/212

[56] References Cited

U.S. PATENT DOCUMENTS

| | | | |
|---|---|---|---|
| 2,302,003 | 11/1972 | Cadwell et al. | 428/85 |
| 3,891,786 | 6/1975 | Conklin | 428/136 |

*Primary Examiner*—James J. Bell
*Attorney, Agent, or Firm*—Cruzan Alexander; Donald M. Sell; William D. Bauer

[57] ABSTRACT

An electrically conductive web for safely and quickly discharging static electricity accumulated on personnel is disclosed. The web comprises a semi-conductive polymeric surface layer, which is in electrical contact with a conductive foraminous layer. The relative conductivity of these layers result in desirable electrical discharge characteristics. The composite structure may be bonded to a suitable supporting substrate and suitable electrical connection between the conductive foraminous layer is made with an electrical ground. Charged personnel coming into contact with the semi-conductive surface layer have their static charge quickly and safely discharged to ground potential.

9 Claims, 2 Drawing Figures

ELECTRICALLY CONDUCTIVE WEB

CROSS-REFERENCE TO RELATED APPLICATION

This application is a continuation-in-part of U.S. Ser. No. 830,841, filed on Sept. 6, 1977, entitled ELECTRICALLY CONDUCTIVE WEB, now abandoned.

BACKGROUND OF THE INVENTION (1) Field of the Invention

This invention relates to an electrically conductive web which may be fabricated into floor mats, curtains, clothing, and other articles. The web exhibits controlled electrical properties which permit it to be effectively used to discharge statically charged objects coming into contact with the semiconductive surface layer.

(2) Description of the Prior Art

A person may become statically charged to a potential of up to 30,000 volts. If a charged person comes into contact with a highly conductive, well-grounded surface, a substantially instantaneous spark discharge will result. Such static discharges can be both uncomfortable and hazardous.

Conventional materials for controlling static electricity are commercially available and are used for a variety of purposes. Typical uses include the elimination of static shock discomfort and spark avoidance in hazardous environments such as munitions plants and medical operating rooms. These materials may also be fabricated into floor mats for use with computer terminals and other static sensitive electronic equipment.

There are two prior approaches to conductive webs used for control of static electricity.

One prior art approach is to provide a mat which is more conductive than applicants'. U.S. Pat. No. 3,406,126 issued Oct. 15, 1968 to I. Litant is an example of a highly conductive web. Highly conductive mats are useful for preventing build up of static charge. However, these webs are usually too conductive to be used for disspiating static charge already accumulated on personnel. A highly conductive floor covering or web will permit substantially instantaneous discharge which may result in hazardous spark discharge.

The second conventional approach to static control involves the use of highly resistive webs. U.S. Pat. No. 3,891,786 issued Oct. 15, 1973 to C. Conklin is a representative example of a carbon loaded prior art web. These webs are usually sufficient to control the discharge of accumulated static. However, such webs usually exhibit electrical characteristics which are dependent on the ambient humidity. In most applications, it is desirable to have a conductive web with electrical discharge properties which are independent of the moisture level of the operating environment.

Applicants' web provides a means for both preventing the build-up of static charge as well as the rapid and safe discharge of accumulated static electricity.

Applicants' web can discharge a statically charged person from 30,000 volts to ground potential within one or two seconds of contacting the mat. However the controlled electrical characteristics of the mat structure also insure sufficient resistivity to prevent spark discharge.

Applicants' novel web structure differs from prior art structures, and exhibits an unusual and desirable electrical discharge property. When applicants' web is grounded and a static charge is applied to the web through an insulative material, applicants' mat exhibits a faster discharge rate than a grounded metal plate, under similar conditions. Although the reason for this anomalous behavior is not known, it is a desirable property since it insures that a statically charged person wearing synthetic soled shoes will be rapidly discharged in spite of the insulative nature of his shoes.

SUMMARY OF THE INVENTION

Applicants' structure comprises a foraminous layer of material, such as a scrim or open cell foam which is rendered electrically conductive by coating it with latex or other suitable binder resin containing conductive carbon particles. The resistivity of the coated foraminous layer should range from approximately $10^3$ to $10^7$ ohms. This coated foraminous layer is then bonded to a layer of semiconductive thermoplastic polymeric material. When a scrim is used as the foraminous layer the semi-conductive polymeric material penetrates and encompasses the conductive scrim making good electrical and mechanical bond with it. This obviates the need for chemical adhesion between the conductive foraminous scrim and the semiconductive polymeric layer while insuring good electrical and mechanical bond.

The polymeric semiconductive layer should have a volume resistivity between $1 \times 10^7$ and $1 \times 10^{12}$ ohm-cm. Suitable polymeric resin for this purpose include thermoplastic materials such as plasticized vinyl, especially in plastisol form. Appropriate plasticizers may be combined with the polyvinyl chloride to yield the desired volume resistivity. Additional additives may be combined with the polymeric resin to impart desirable physical properties such as abrasion resistance, toughness, color and flexibility. The semiconductive layer should preferably have a thickness between 0.010 and 0.125 inches (0.025 cm and 0.039 cm). After curing, a supporting substrate may be bonded to the web material to produce the finished article.

A conductive connection is made with the finished web to enable a ground wire to be connected to the conductive foraminous layer. Typically this connection may be formed as a metallic grommet which perforates the web making electrical contact with the coated foraminous layer.

DESCRIPTION OF THE PREFERRED EMBODIMENTS

Figure 1:
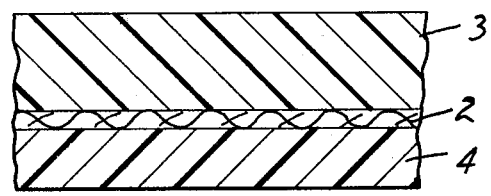
FIG. 1 is a fragmentary cross-section of the completed web structure showing a conductive scrim as the foraminous web.

In FIG. 1, a coated conductive foraminous layer 2 is shown partially embedded in a semiconductive polymeric material 3. This composite structure is then bonded to a suitable support substrate 4. The support substrate is selected to match the mechanical characteristics of the finished web with its intended application. A resilient foam layer may be used to provide cushioning when the mat is used as a floor covering over hard surfaces and a thin sheet of stiff plastic or fiberboard may be used when the mat or web is used under chairs especially over carpeting.

Figure 2:
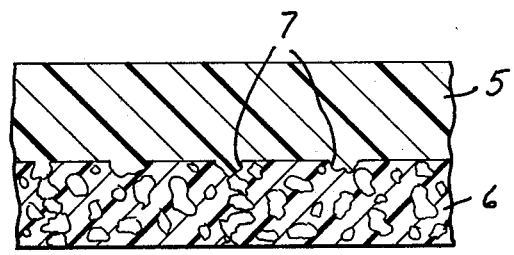
FIG. 2 is a fragmentary cross-section of a second embodiment 30 of the web structure showing a conductive foam as the foraminous web.

In FIG. 2, a conductive foam layer 6 forms a foraminous web which is bonded to a semiconductive polymeric layer 5. The area 7 shows semiconductive polymeric material penetrating the foam, insuring a good mechanical and electrical connection with the semiconductive layer.

The foraminous layer may be an open weave textile scrim of sufficient strength to impart toughness and mechanical strength to the composite structure. Woven cotton scrim with 12-24 yarns per inch has sufficient strength for use as a conductive floor mat. Such a scrim may be rendered electrically conductive by coating the scrim with carbon mixed with a suitable binder such as chloroprene latex.

The foraminous layer may also take the form of an open cell foam such as urethane foam. This type of foraminous layer may be rendered electrically conductive by immersing it in a carbon loaded chloroprene latex, to coat it.

In either embodiment, sufficient carbon must be included in the completed foraminous layer to produce a resistivity of the web between approximately $10^3$ to $10^7$ ohms as measured between two 2.27 kg, 6.35 cm (dia.) electrodes placed 1.27 cm apart on the web with a DC potential difference between the electrodes of 500 volts.

Although the exact amount of carbon loading necessary to meet these parameters depends upon the inherent conductivity of the foraminous layer, textile scrims having approximately 0.34 grams/$m^2$ to 7.9 g/$m^2$ of carbon black suspended in latex or chloroprene binder have been found to provide operable resistivity.

The semiconductive polymeric material must exhibit a volume resistivity of $10^7$ to $10^{12}$ ohms-cm. The specific resistivity is selected to match the finished web to its intended application. Generally the greater volume resistivity the longer it takes the web to dishcarge a given static potential.

It should be noted that the discharge rate decreases linearly with the increased thickness of the semi-conductive layer. This parameter may be varied to match the electrical and mechanical properties of the completed web to its intended use.

Also, for a given polymeric material the type and amount of plasticizer can be used to control the volume resistivity exhibited by the semiconductive layer. In general, increasing the amount of plasticizer used decreases the volume resistivity of the material.

The following two examples serve to illustrate the invention. In each example, the dry and liquid ingredients are mixed with a paddle mixer until well dispersed. Films cast from these resins are cured for 5 minutes at 170° C. and are then tested for volume resistivity.

EXAMPLE 1

| | Parts by Weight |
|---|---|
| (a) Resin: Copolymer, 95% polyvinyl chloride, 5% polyvinyl acetate | 185.0 |
| (b) Plasticizer: Diisodecyl Phthalate | 140.0 |
| (c) Plasticizer: Epoxidized soybean oil | 9.6 |
| (d) Stabilizer: Barium/cadmium liquid | 5.5 |
| (e) Fungicide: | 1.7 |
| (f) Pigment: | 7.0 |
| Volume Resistivity $7 \times 10^{10}$ ohm-cm | |

EXAMPLE 2

| | Parts by Weight |
|---|---|
| (a) Resin: Cellulose acetate butyrate | 5.0 |
| (b) Plasticizer-AT Low viscosity, butyl-capped, low molecular weight ethylene oxide oligomer such as Mobay ® antistatic plasticiz-AT (Mobay is a registered trademark of Mobay Chemicals, Pittsburg, Pennsylvania, U.S.A.) | 4.0 |
| Volume Resistivity $5.3 \times 10^{10}$ ohm-cm | |

The electrically conductive web is fabricated by combining either one of the two preceding exemplar resins with the conductive foraminous layer. This may be conveniently accomplished by laying a thin (0.010-0.125 inch) layer of the resin on a patterned release fabric. This layer is then heated for 3 minutes at 170° C. to "gel" the resin. The conductive foraminous layer is laid on top of the gelled layer and additional resin must be applied to the surface of the foraminous layer to fill and slightly overcoat the web material if desired. The composite is then cured at 170° C. for six minutes. If desired, the composite may be bonded to a suitable support substrate with an appropriate adhesive. The finished material exhibits good mechanical bonding between the semiconductive layer and the conductive foraminous layer.

When the finished material is to be used as a floor covering, it is desirable to insert a metallic grommet through the finished web to make electrical contact with foraminous conductive layer and thus permit a ground wire to be connected to the floor covering.

Samples of a web formed in accordance with this invention exhibit electrical discharge characteristics as delineated in Table 1.

Table 1

| Sample No. | Caliper (inches) | Volume Resistivity (ohm-cm) | Discharge Time (seconds) 5kv to 1kv |
|---|---|---|---|
| 1 | .057 | $7 \times 10^9$ | .2 |
| 2 | .094 | $5 \times 10^9$ | .2 |
| 3 | .078 | $8 \times 10^9$ | .2 |
| 4 | .086 | $6 \times 10^9$ | .2 |
| 5 | .108 | $9 \times 10^9$ | .2 |

A web formed in accordance with the present invention also exhibits an unusual and desirable electrical property when the web is grounded for use as a floor mat. In such applications, it is highly desirable to discharge a charged person very quickly. Leather soles are relatively good conductors and permit rapid discharge times. However, it has been found that a person wearing shoes with synthetic soles is discharged very slowly when in contact with conventional materials. It has been found that a person with synthetic soles may be discharged more quickly when in contact with a grounded floor mat formed in accordance with the present invention than when in contact with a grounded metal plate. This phenomenon was verified by measuring the amount of time that was required to discharge an electrode which simulates a person from 5,000 volts to 1,000 volts through an insulative layer of polymeric material which simulates the synthetic sole of a shoe. The insulating layer has a volume resistivity of $5 \times 10^{12}$ ohm-cm. The charged electrode with the insulative layer was placed in contact with a grounded conductive web and the discharge time was measured. Then the electrode and insulative layer was recharged and placed in contact with a grounded metal plate and discharge time was again measured. The results of this test are summarized in Table 2.

Table 2

| Grounded Conductive Web Discharge Time (sec) 5,000 v - 1,000 v | Grounded Metal Plate Discharge Time (sec) 5,000 v - 1,000 v |
|---|---|
| 5.0 | 23.0 |
| 4.8 | 25.0 |
| 5.0 | 31.0 |
| 6.0 | 7.0 |
| 7.0 | 7.0 |
| 6.0 | 10.0 |
| 5.0 | 16.0 |
| 9.0 | 13.0 |
| 7.0 | 13.0 |
| 4.0 | 19.0 |
| 5.0 | 15.0 |
| 6.0 | 8.0 |

Average Discharge Time = 5.8 sec. Average Discharge Time = 12 sec.

What is claimed is:

1. A conductive web for discharging a static electric charge impressed thereon comprising:
   a layer of semiconductive thermoplastic polymeric material with a volume resistivity between $1 \times 10^7$ and $1 \times 10^{12}$ ohm-cm, in direct physical and electrical connection with,
   a foraminous layer, coated with carbon loaded resinous material to impart a resistivity of between $10^3$ ohms and $10^7$ ohms, forming a completed conductive web and,
   conductive means in electrical contact with said foraminous layer for connecting said foraminous layer to ground potential.

2. A conductive web for discharging a static electric charge impressed thereon comprising:
   a layer of semiconductive thermoplastic polymeric material formed from a resin consisting essentially of a copolymer resin of 95% polyvinyl chloride and 5% polyvinyl acetate plasticized with diisodecyl phthalate and epoxidized soybean oil exhibiting a volume resistivity between $1 \times 10^7$ and $1 \times 10^{12}$ ohm-cm in direct physical, and electrical contact with,
   a foraminous layer coated with carbon loaded resinous material to impart a resistivity of between $10^3$ and $10^7$ ohms, and
   conductive means in electrical contact with said foraminous layer for connecting said foraminous layer to ground potential.

3. A conductive web for discharging a static electric charge impressed thereon comprising:
   a layer of semiconductive thermoplastic polymeric material formed from a resin consisting essentially of cellulose acetate butyrate plasticized with a low viscosity monomeric plasticizer characterized as a butyl-capped, ethylene oxide oligmer exhibiting a volume resistivity between $1 \times 10^7$ ohm-cm and $1 \times 10^{12}$ ohm-cm, in direct physical and electrical connection with,
   a foraminous layer, coated with carbon loaded resinous material to impart a resistivity between $1 \times 10^3$ and $1 \times 10^7$ ohms and
   conductive means in electrical contact with said foraminous layer for connecting said foraminous layer to ground potential.

4. The conductive web of claim 1 wherein said foraminous layer is characterized as an open cell polymeric foam.

5. The conductive web of claim 1 wherein said foraminous layer is characterized as an open weave textile scrim.

6. The conductive web of claim 1 wherein said conductive means in electrical contact with said foraminous layer is characterized as a metallic grommet which perforates the completed conductive web and passes through said foraminous layer.

7. The conductive web of claim 1 further including a support substrate bonded to said foraminous layer.

8. The conductive web of claim 7 wherein said support substrate is characterized as a flexible polymeric foam.

9. The conductive web of claim 7 wherein said support substrate is characterized as a rigid sheet.

* * * * *